(No Model.)
J. LEPINE.
Hame Fastener.
No. 241,145.　　　　　　　　　Patented May 10, 1881.
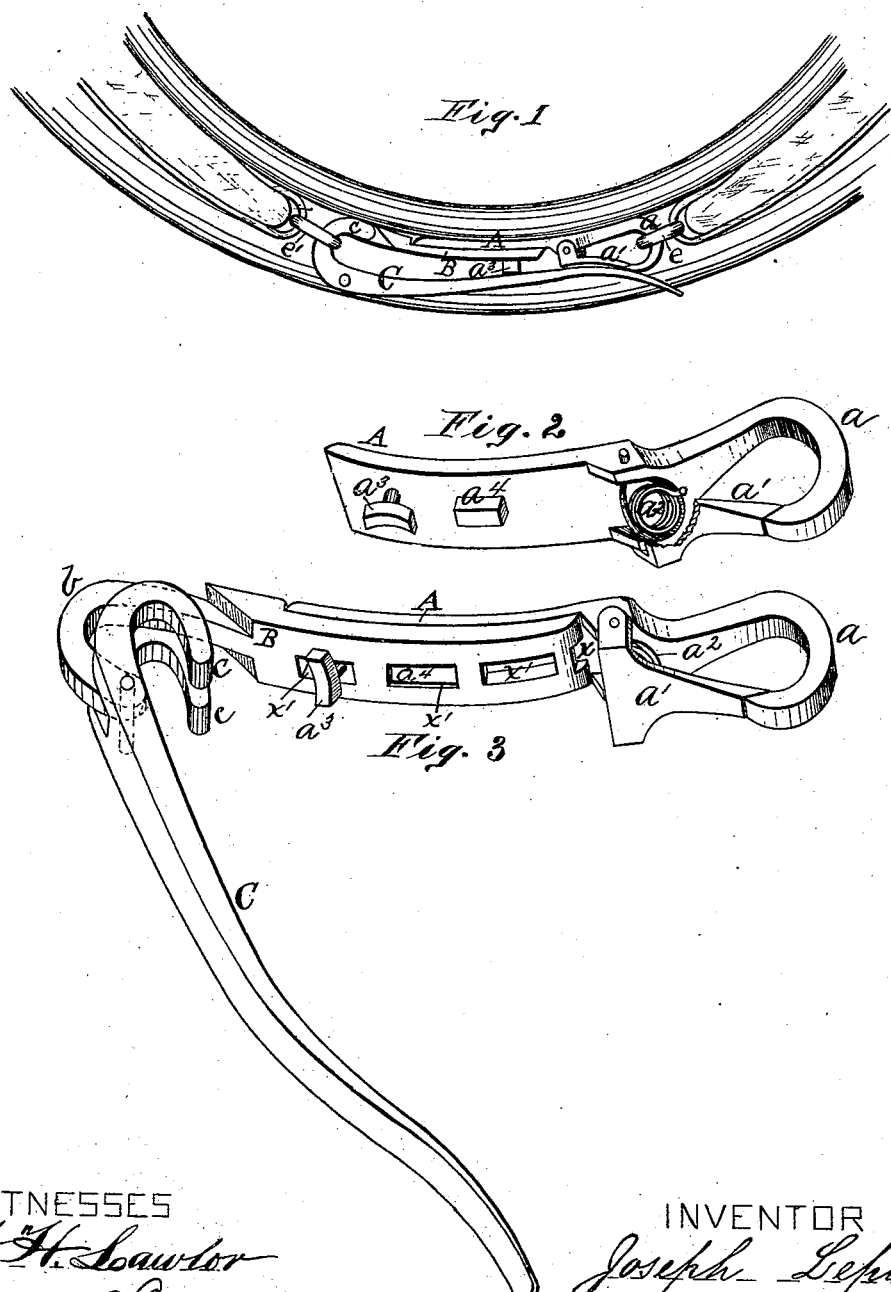
WITNESSES　　　　　　　　　　　INVENTOR

UNITED STATES PATENT OFFICE.

JOSEPH LÉPINE, OF FRANKFORT, MICHIGAN, ASSIGNOR OF ONE-HALF TO GEORGE GREENWOOD, OF SAME PLACE.

HAME-FASTENER.

SPECIFICATION forming part of Letters Patent No. 241,145, dated May 10, 1881.

Application filed October 6, 1880. (No model.)

*To all whom it may concern:*

Be it known that I, JOSEPH LÉPINE, a citizen of the United States, residing in Frankfort, in the county of Benzie and State of Michigan, have invented a new and useful Hame-Fastener, of which the following is a specification.

My invention relates to improvements in hame-fasteners having one end removably secured to the loop of one of the hames and provided with a pivoted hook passing through the opposite loop, so that when swung upon its pivot the free ends of the hames will be drawn toward each other and locked upon the collar; and the objects of my invention are, first, to provide the fastener with means for quickly attaching it to or detaching it from the hames; second, to provide for the longitudinal adjustment of the fastener, to adapt it to hames of varying lengths or for securing a given size of hames upon varying sizes of collars; and, finally, to provide said fastener with a locking device adapted to be tightened and held in position when closed upon the hame by the lateral strain of the hame. I attain these objects by devices illustrated in the accompanying drawings, in which—

Figure 1 is a side elevation of my fastener, showing its application; Fig. 2, a perspective of the detachable and adjustable plate, terminating in a snap-hook; and Fig. 3, a perspective of my fastener with the pivoted hook-lever swung outwardly.

Similar letters of reference indicate the same parts in the several figures of the drawings.

A represents a curved metal plate, terminating at one end in a hook, $a$, provided with an inwardly-opening snap or jaw, $a'$, which is actuated to close the hook by an ordinary coiled spring, $a^2$, confined between the snap and the shank of the hook.

Near the straight end, and upon the face of the plate A, is pivoted a headed bolt, $a^3$, and between the pivoted bolt and the hook $a$ is secured a lug, $a^4$, as shown in Fig. 2.

B represents a plate corresponding in width to the plate A, and terminating at one end in an open hook, $b$, forming a continuation of said plate, but of a diminished width, the opposite end of said plate being provided with a recess, $x$, corresponding in width with three or more slots, $x'$ $x'$ $x'$, which, in turn, correspond with the pivoted bolt-head and the lug on the plate $a$ both in size and relative position to each other.

By turning the pivoted bolt so that its head, which is rectangular in shape, will have its sides in a line parallel with the sides of the plate, the bolt-head may be passed through the slot of the plate B, next the hook of said plate, the lug $a^4$ at the same time entering the adjoining slot, in which position the two plates may be locked together, as shown in Fig. 2, by giving the bolt a half-turn, so that its head will lie across the slot and at a right angle to the length of the plates.

When it is desirable to increase the distance between the hooks, to adapt the fastener to hames having a greater distance between its free ends, the headed bolt may be secured in the middle slot and the lug enter the end slot; or, for a further increase of length, the headed bolt may be passed through the end slot, in which case the lug will enter the end recess to prevent a lateral movement of the plates, as it does when entering the slots before referred to.

The plate B is thickened near its hook end, and both plates are slightly curved, so that a neat joint will be formed and a substantially continuous surface be made conforming in shape and adapted to fit closely against the collar when the hames are fastened. It is obvious, however, that both plates might be made straight and of varying thicknesses, and that their inner faces might be provided with a series of transverse ratchet-teeth, so that by passing an ordinary bolt provided with a nut upon one end or a screw through one or more of a corresponding series of perforations in each plate said plates will be removably and adjustably held together in substantially the manner before described.

C represents a lever curved at its free end, to correspond with the curvature of the outer face of the snap-hook, and terminating at its opposite end with hooks $c\,c$, straddling and pivoted near their shanks to the end of hook $b$, with which they coincide when the curved end of the lever rests against the snap-hook, as shown in Fig. 1, said hooks and lever, when in this position, apparently forming a continuation of the slotted plate.

In attaching my fastener to the hames the lever is swung outwardly to free the snap-hook, which is then secured to the loop $e$ of the hames and the lever passed through the opposite loop, $e'$, when, by taking hold of and pressing the end of the lever upwardly, the loop $e'$ is forced into the hooks $c\ c$, and by being so forced the ends of the hames are drawn toward each other, which results in tightening the hames upon the collar.

It will be observed that when the lever is in position to close the fastener upon the hames the line of strain of the hames upon the hooks $c\ c$ is in a plane above their pivot and the inner face of the lever, the result of which is that the free end of the lever will be drawn and held against the snap-hook the moment this line of strain is established while lifting it, the locking force of the lever depending upon the amount of strain produced in drawing the ends of the hames toward each other.

I have shown the hooks as cast with the plates and lever; but they may be formed separate and riveted to or otherwise secured without departing from the spirit of my invention.

What I claim is—

1. The combination hereinbefore set forth of the plate A, provided at one end with a snap-hook and at or near its opposite end with a pivoted bolt, $a^3$, with the plate B, provided with a series of slots or perforations, $x'$, and with a hook, $b$, whereby said plates are removably and adjustably secured together and adapted for fastening hames, as set forth.

2. In a hame-fastener, the combination of the plate A, snap-hook $a$, pivoted bolt $a^3$, and lug $a^4$ with the plate B, slotted as described, and provided with hook $b$, and pivoted hook-lever C, substantially as shown and described.

JOSEPH LÉPINE.

Witnesses:
  WILLIAM A. CAMPBELL,
  EDGAR L. AVERILL.